Aug. 16, 1960    A. W. ALLEN ET AL    2,948,955
FRICTION ARTICLE

Filed Oct. 8, 1957    2 Sheets-Sheet 2

INVENTOR.
ROBERT H. HERRON
ALFRED W. ALLEN
BY
Cecil D. Arens
ATTORNEY

United States Patent Office 2,948,955
Patented Aug. 16, 1960

2,948,955

FRICTION ARTICLE

Alfred W. Allen, Urbana, Ill., and Robert H. Herron, South Bend, Ind., assignors to Bendix Aviation Corporation, South Bend, Ind., a corporation of Delaware Filed Oct. 8, 1957, Ser. No. 688,917

11 Claims. (Cl. 29—182.5)

This invention relates to a friction article and more particularly to an improved friction material composition and to the combination of the composition with a suitable retainer, for use in high kinetic energy braking such as aircraft braking.

The present invention constitutes an improvement over the braking composition disclosed in the copending Pocock and Stedman application Serial No. 257,162, filed November 19, 1951, now abandoned, a continuation of this application being application Serial No. 545,637, filed November 8, 1955, and now U.S. Patent No. 2,784,105, issued March 5, 1957, the method for making the friction article being illustrated in Pocock application Serial No. 257,292, filed November 20, 1951, now abandoned. Application No. 600,808 forms a continuation-in-part of application No. 257,292; this continuation-in-part was filed July 30, 1956, and superseded application No. 257,-292. The present application is a continuation-in-part of application Serial No. 355,586 filed May 18, 1953, now abandoned.

The service requirements of aircraft brakes have exceeded the capacity of conventional organic linings to such an extent that braking compositions of the organic type will eventually be displaced to a large extent by ceramic-metallic linings of the type disclosed in application Serial No. 257,162, reference to which is made for a statement of further advantages of the ceramic-metallic lining. In general, it can be stated that brake lining compositions having a high concentration of ceramic friction material have proved to combine the advantages of more effective braking and longer service life.

It has been found by experimentation, and it will be later illustrated graphically, that while increasing the amount of the ceramic prime friction material such as calcined kyanite will improve the effectiveness and decrease wear of a ceramic-metallic lining, the high concentration of ceramic tends to accentuate the "slip-stick" friction property of the brake, that is, the tendency of the brake to alternately grab and release near the end of the braking cycle, a condition commonly referred to as "chatter." When "chatter" of the brake is sought to be eliminated the remedy must, in some way, be related to the cause of the condition and hence the nature of what produces and what is associated with "chatter" of the brake has been investigated. "Chatter" is related to the difference in static and kinetic coefficients of friction of the engaging surfaces of the brake. When the difference between the static and kinetic coefficients of friction becomes great or when they become very greatly disproportionate then this is an indication that brake chattering will occur. We have found that this problem of "chatter" is greatly accentuated by use of a ceramic-metallic lining having the characteristic of torque build-up near the end of the braking cycle, owing to an increase in the braking effectiveness with decreasing velocity.

It has been found by experience that this torque build-up condition is associated with a "glaze" formation on the surface of the friction article which consists predominately of oxidation products of high valence iron which are formed under the influence of heat absorbed during the braking cycle. The consistent association of the high torque build-up which causes "chatter" and the formation of high melting "glaze" on the surface of the lining leads to the reasonable inference that a high melting point "glaze" is one of the primary causes of "chatter."

As an illustration of braking conditions encountered, the surface of the friction article may be elevated to temperatures above approximately a red heat and believed to be about 2500° F. as the aircraft is braked during a landing operation, and it is under the influence of such high temperatures that objectionable high melting point "glaze" is formed with oxidation products of iron.

It is therefore an object of the present invention to eliminate the excessive increase in torque delivery by the brake at the end of the stop which tends to support chatter.

Another object of the invention is to obtain a brake lining which will tolerate a high concentration of friction-producing ceramic in order to achieve a more effective brake with a longer service life, but will yet avoid the effect of brake chatter heretofore associated with higher concentrations of friction-producing ceramic.

Another object of the invention is to produce a friction article which is self-compensating for effects of oxidation induced by high heats absorbed by the brake from kinetic energy of the aircraft.

Another object of the invention is to provide a brake lining which will not coat engaging surfaces during a brake application.

The above and other objects and features of the invention will appear more fully hereinafter from a consideration of the following description, taken in connection with the accompanying drawings illustrating the friction article, the test equipment, and performance of a plurality of braking compositions which are described by way of example.

Figure 1:
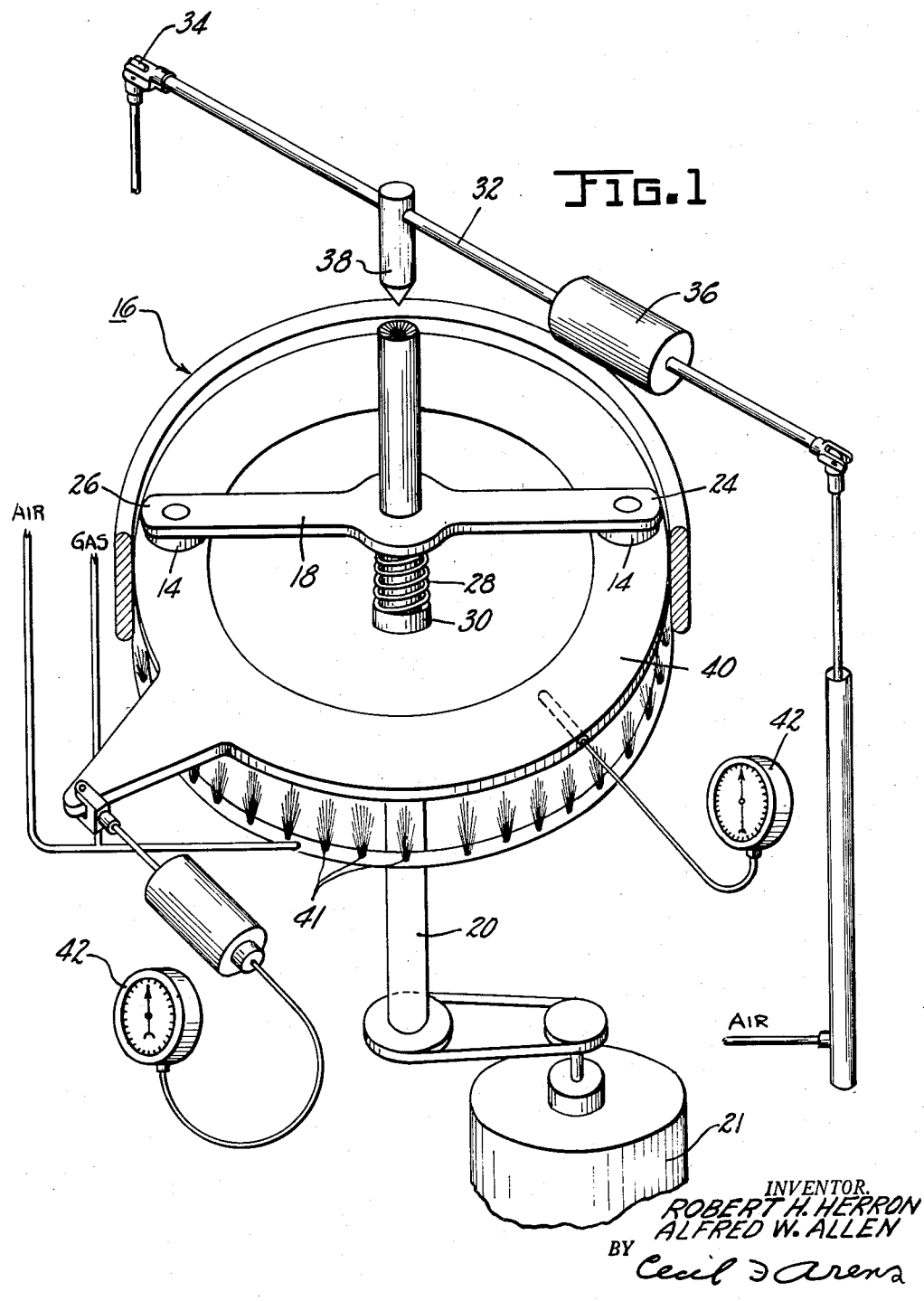
Figure 1 is an isometric view of a button testing machine used to preliminarily test the braking composition specimens.

The generally desirable characteristics of a ceramic-metallic brake include its ability to withstand the high temperatures encountered during high speed stops which are characteristic of aircraft braking. Surface temperatures at least as high as 2500° F. are not uncommon in this field, and one of the effects of high heat absorbed by the brake is partial oxidation of ferrous retaining member 10, friction composition 12 being compacted and sintered therein to form the complete friction article 14. This surface temperature of at least 2500° F. is established by identifying fayalite formation upon analysis of the article after a series of braking tests. Observation indicates that a high melting point "glaze" composed predominately of oxidation products of high valence iron cover the surface of the lining. Experimentation indicates that this type of glaze is a cause of the excessive torque build-up supporting slip-stick characteristics of the brake.

The preferred friction composition 12 consists broadly of a predominately copper metal matrix, a prime friction-producing heat treated ceramic consisting predominately of mullite, a carbonaceous lubricant such as graphite, for some applications a matrix-insoluble secondary friction-producing agent such as iron, and varying amounts of an antioxidant in the form of molybdenum or tungsten. The purpose of the molybdenum is to control the valence state of the iron in its oxide phase to maintain a low melting point "glaze."

Broadly speaking, three factors account for the improved results obtained with the preferred friction article 14; the first of which involves providing a ferrous retaining member 10 to permit formulating the friction-producing composition 12 more with a view to such properties as wear and effectiveness and less to the strength of the compact, this function being supplied by the ferrous retainer 10. The second factor has to do with increasing the prime friction-producing ceramic in the composition to multiply the number of stops which the brake can deliver and to give greater braking effectiveness, while at the same time minimizing the effect of high temperatures on braking qualities. The third factor relates to the use of an antioxidant such as molybdenum or tungsten for making the lining self-compensatory as to effects of oxidation which accompany braking conditions thereby preventing brake "chatter," a condition heretofore associated with higher concentrations of ceramic friction material.

The function of each of the constituents of the lining-matrix, friction producing material, lubricant, and antioxidant is best understood if considered separately and in relation both to eliminating "chatter" and to the other requirements of the brake, such requirements being among others; wear, effectiveness, and mechanical strength. It is to be understood, however, that these constituents are interrelated and necessarily affect to some degree each other's function.

The matrix both in composition and amount is generally related to the heat conductivity of the brake, its mechanical strength effectiveness, and also, to some extent, to the tendency of the brake to support "chatter."

To establish the limits defining the range of matrix material which would give improved "chatter" characteristics, lining specimens were made up with graduations in amount of matrix material varying from 20% to 90% of the lining. These specimens were then tested on a button testing machine 16 of the type illustrated in Figure 1, the operation of which will be explained later in this description. A series of braking applications of the specimens were then made and by calipering the thickness of the specimens after these applications an average value of the wear per surface per stop could be calculated. Braking effectiveness of the specimens was also determined within the range of 20%–90% matrix. As a result of these wear and effectiveness tests it was determined that the matrix could be varied between the approximate limits of 35%–65%. Within this range an optimum relationship between metals and non-metals was achieved. That is, there was sufficient matrix to bond the friction-producing ceramic and yet enough ceramic to produce sufficient braking effectiveness.

Other considerations were taken into account in determining the optimum range of matrix material. These additional considerations involve the thermal conductivity of the brake lining and also the tendency of the brake lining to support "chatter." These additional factors will next be considered in relation to establishing the optimum range of matrix material. Since the "glaze" formed on the surface of the lining is the result of high temperatures in the brake, the matrix is related to the problem of "glazing," and hence torque build-up, by its effect on heat conductivity of the lining and therefore operating temperatures. With a small amount of matrix material the thermal conductivity of the lining is low, resulting in surface temperatures which are sufficiently elevated to cause a controlled melting of the "glaze," thereby tending to prevent torque build-up. With the lower percentages of matrix the strength of the friction material is diminished and the rate of wear of the lining is greater; therefore, these considerations dictate the lower limits of matrix content. For present braking purposes this lower limit is established at approximately 35% by weight of matrix.

As the matrix is increased above approximately 65% the brake composition tends to have lower effectiveness and greater tendency to support "chatter." Above this upper limit of matrix content the effectiveness is reduced because of the smaller amount of friction-producing ceramic material. Also, the higher amounts of matrix reduce the surface temperature of the lining by reason of greater heat conductivity of the friction article. This substantial reduction of surface temperature is thought to be a factor contributing to chatter of the brake, since there is less melting of the "glaze."

Another important factor to be considered in relation to chatter is the effect of the matrix as a lubricant. With lower amounts of ceramic there is sufficient matrix exposed to the mating surface of the rotor so that the metallic matrix contributes to lubrication. When the ceramic content is increased, however, the lubrication at the surface of the lining is not influenced to as great a degree by the matrix and hence must be controlled by means other than the matrix, in a manner which will be explained more fully later in this description.

The preferred prime friction producing material used in the lining is a heat treated ceramic, predominately mullite ($3Al_2O_3 \cdot 2SiO_2$). Mullite may be derived from following the two methods:

(A) Heat treating stoichiometric quantities of alumina and silica in a process to produce mullite by crystallization from a melt.

(B) Sintering stoichiometric proportions of alumina and silica to produce mullite.

The alumina and silica in either method may be derived from naturally-occurring materials such as minerals of the sillimanite group, topaz or argillaceous raw materials having as their primary constituents minerals of the kaolinite or aluminous groups (bauxitic, diasporitic or gibbsitic). Varying amounts of silica ($SiO_2$) may be added to increase effectiveness of the lining and decrease wear without contributing to brake "chatter."

As a general proposition, within limits the greater the concentration of prime friction producing material, the more effective the brake and the greater the service life, but there exists the accompanying disadvantage of greater torque build-up at the end of the stop. It is one of the important aims of the present invention to provide a brake lining composition having high concentrations of ceramic, with the accompanying advantages, but without the excessive torque build-up characteristics often associated with such brake lining compositions. By following the teaching of the present invention it is possible to obtain improved braking compositions with as high as 43% of ceramic material. A second ceramic such as SiO may be used to supplement or augment the friction effect produced by the prime friction producing material. The total amount of ceramic used is limited by its tendency to cause "chatter" and decrease the strength of the lining. The secondary friction producing ceramic can be entirely eliminated for some braking usages.

In development work prior to the present invention, lining specimens were fabricated varying the amount of this material in graduations of 5% within the limits of 10% to about 50% by weight of the composition in order to determine the optimum range of ceramic material.

As a result of these tests it was found that the amount of torque build-up increased slightly as the ceramic content was increased from 10% to 20% by weight of the lining; further additions of ceramic tended to decrease the torque build-up until the lining was about 30% ceramic material. Further additions of ceramic had the effect of increasing torque build-up which eventually caused inoperability of the lining when the ceramic content reached about 50% by weight of the lining.

The effect of varying the ceramic content on other operating characteristics of the lining was simultaneously determined. The effect of ceramic content on the wear pattern of the lining is as follows: it was found that a low ceramic content lining had high wear; increasing the ceramic had the effect of decreasing wear per surface per stop until the ceramic content was about 43% of the lining. Beyond this concentration of ceramic the rate of wear increased sharply, indicating that there was insufficient matrix to form adequate bonding with the friction producing material.

The effectiveness of the lining is also related to the ceramic content. It appears to be generally true that the higher concentrations of ceramic tend to produce more effective linings; however, there is evidence tending to indicate that this relationship is not directly proportional, and that optimum results may be obtained in the range of 20% to 35% (total ceramic content).

Taking into account each of the factors of wear, effectiveness and torque build-up, the results of these tests indicated that an operative brake lining can be provided by compositions which have a ceramic content varying from about 15% to 43% by weight of the lining. The tests performed to establish the maximum operative range were made on the button testing machine described herein. For conclusive results dynamometer tests are necessary. While numerous dynamometer tests have been carried out on compositions of the type disclosed herein, it has been impossible, for reasons of economy and time, to perform all the dynamometer tests to establish the entire range of ceramic material. However, sufficient dynamometer tests (and in some instances, flight tests) have been made to prove the satisfactory operation of all the compositions listed in Table I below. Based on the dynamometer and flight test results, it is believed that the optimum range of total ceramic content is approximately 21% to 31%.

A lubricating material such as graphite or equivalent carbonaceous material may be added in varying amounts to further reduce the tendency of the brake to "chatter." The required amount of graphite is dependent on the other constituents of the lining and the extent to which they already contribute to its lubricating qualities. The amount of the graphite or other lubricating material is governed by design requirements. Amounts which have proved satisfactory in actual dynamometer tested compositions showing more satisfactory torque build-up characteristics have varied from 8% to as little as 1.1%, and conceivably this material could be deleted entirely if properly compensated for by increasing the lubricating effect of one or more of the other constituents of the lining.

A metallic lubricant such as lead may be included in the composition for some usages. The lead addition has varied from 2.0%–3.7%. Plastic deformation of the lead is believed to occur as well as some melting during the braking cycle in such a manner that this ingredient serves to decrease the coefficient of friction of the lining and acts as a lubricant.

For some applications, we have found that adding amounts of a refractory, matrix-insoluble metal such as iron helps to increase the effectiveness of the brake and prolong the wear life of the lining without appreciably contributing to brake "chatter." The amount of iron or equivalent material is varied depending upon the braking characteristics and wear pattern desired. While this ingredient is not absolutely essential to obtain the improved brake lining characteristics of the present invention, yet it is useful for contributing to a greater effectiveness without appreciably contributing to brake "chatter." Amounts have been used in the range of 5% to 15%. The actual amount used is not critical but may be varied to suit requirements. It has been found that the iron also serves as a scouring agent which acts to remove any braking composition transferred to the engaging surfaces on the relatively movable part of the brake.

According to the principles of the present invention, a significant improvement in brake composition is provided by an antioxidant such as molybdenum. The function of this material is to serve as an "oxygen-getter," which function it accomplishes by reason of its affinity for free oxygen. As explained previously, there is evidence tending to indicate that the torque build-up which occurs at the end of the braking cycle is caused by a film of high melting point "glaze" which is formed over the surface of the friction article and which experimentation indicates as including oxides of iron originating both from the sides of the ferrous retaining cup and the mating surface of the rotor which are oxidized during the course of braking. Chemical, microscopic, and X-ray analyses indicate that the objectionable type of "glaze" is composed largely of oxides of iron in its highest valence forms. The molybdenum shows definite indications of accomplishing reduction (and elimination) of "chatter" by inhibiting the formation of higher melting point "glaze" over the surface of the friction article. Since molybdenum has a greater affinity for oxygen than iron, it acts to prevent the existence of iron in its highest valence form thereby maintaining a lower melting point "glaze." As supporting evidence, Fayalite was identified in the "glaze." Fayalite ($2FeO.SiO_2$) is stable only in an environment of the lowest valence states of iron. Conceivably, other metals having an affinity for oxygen would operate in the same manner as molybdenum and accomplish the same desirable result. Tungsten has been tested and has shown generally the same function as molybdenum. Molybdenum has been used and proved satisfactory for alleviating chatter of brake compositions in amounts up to 12.5%, and as little as 1.0% has proved satisfactory.

To determine the optimum amount of molybdenum, lining specimens were formulated with graduated amounts of molybdenum in the range of 1.0% to 12.5% by weight of the lining. These specimens were then dynamometer tested to obtain torque-speed recordings from which chatter characteristics could be determined.

The testing results indicate that amounts of molybdenum may be used in the range of from about 1% to 12.5%. The effect of increasing the molybdenum in the range of this higher amount does not generally give a proportionate change in effect on braking "chatter." Tests have also revealed that the particle size of the molybdenum has an effect upon its function in reducing brake "chatter." Particle sizes of molybdenum in the range of −200 to −300 mesh have proved satisfactory.

From a consideration of testing results, it can be stated that the effect of molybdenum depends upon the heat conductivity of the lining and the measure in which it affects the operating temperatures. In other words, the function of molybdenum as an antioxidant becomes most apparent when the ratio of metals to non metals is low, and surface temperatures are sufficiently elevated to cause the "glaze" to soften and/or melt.

A useful generalization that may be applied is that the higher energy absorbing usages require higher ceramic content in the lining, thereby necessitating the use of molybdenum. It is, therefore, apparent that the amount of antioxidant actually used in the lining depends on the other constituents and the service needs.

Finely-divided molybdenum, preferably in particle sizes of 200 to 300 mesh, is mixed with the finely-divided matrix metals and ceramic material, and a selected quantity of the material is measured out and compacted in a suitable die by the use of pressures in the neighborhood of 40,000 to 100,000 lbs. per square inch. The resultant compact is then sintered to cause coalescence or alloying of the alloyable materials which form into an integrated mass or matrix having a degree of porosity, the pores serving as pockets for containing the non-alloyable materials. Suitable sintering temperatures range between 1100° F. and 1900° F., and sintering times may range between 20 minutes to 1½ hours.

By way of a specific example, and following the above procedure, a composition is formed in which a metal matrix constitutes 55% of the composition and consists of copper, zinc, and tin in the relative proportions of 84:10:6. Combined with the matrix material is 8% of iron, 24% of calcined kyanite, 4% of silica, 8% of graphite and about 5% of molybdenum. The foregoing materials, in finely-divided form, are compacted and sintered in a ferrous retaining member. The composition, when heated from kinetic energy absorbed during braking, was found to prevent objectionable chatter of the brake.

Examples of 20 lining formulations which have shown reduced torque build-up based on either dynamometer test (simulating actual braking conditions) or actual aircraft braking under service conditions, are as follows:

Table 1

|  | 1 | 2 | 3 | 4 | 5 | 6 | 7 | 8 | 9 | 10 |
|---|---|---|---|---|---|---|---|---|---|---|
| Matrix: | | | | | | | | | | |
| copper | 47.1 | 49.6 | 44.6 | 44.7 | 44.9 | 46.2 | 52.4 | 53.9 | 54.0 | 51.6 |
| zinc | | | | | | | | | | |
| tin | | | | | | | | | | |
| nickel | 7.1 | 7.1 | 7.1 | | | 7.0 | 6.6 | 6.7 | 6.7 | 6.4 |
| titanium | 3.6 | 3.6 | 3.6 | | | 3.5 | 3.3 | 3.4 | 3.4 | 3.2 |
| brass chips | | | | | | | | | | |
| iron [1] | | | | 15.0 | 15.0 | | | | | |
| Total | 57.8 | 60.3 | 55.3 | 59.7 | 59.9 | 56.7 | 62.3 | 64.0 | 64.1 | 61.2 |
| Friction Material: | | | | | | | | | | |
| calcined kyanite | 26.1 | 26.1 | 26.1 | 24.9 | 19.9 | 25.6 | 24.0 | 24.6 | 24.0 | 22.9 |
| silica | 4.8 | 4.8 | 4.8 | 4.6 | 4.6 | 4.8 | 4.4 | 4.6 | 4.5 | 4.3 |
| Total | 30.9 | 30.9 | 30.9 | 29.5 | 24.5 | 30.4 | 28.4 | 29.2 | 28.5 | 27.2 |
| Lubricant: | | | | | | | | | | |
| graphite | 1.2 | 1.2 | 1.2 | 1.1 | 6.1 | 1.1 | 1.1 | 1.1 | 1.1 | 1.0 |
| hard coal | | | | | | | | | 1.6 | 1.5 |
| lead | | | | | | 2.0 | 3.7 | 2.8 | | |
| Total | 1.2 | 1.2 | 1.2 | 1.1 | 6.1 | 3.1 | 4.8 | 3.9 | 2.7 | 2.5 |
| Antioxidant: | | | | | | | | | | |
| molybdenum | 10.0 | 7.5 | 12.5 | 9.5 | 9.5 | 9.8 | 4.6 | 2.8 | 4.7 | 9.1 |
| Total | 10.0 | 7.5 | 12.5 | 9.5 | 9.5 | 9.8 | 4.6 | 2.8 | 4.7 | 9.1 |

|  | 11 | 12 | 13 | 14 | 15 | 16 | 17 | 18 | 19 | 20 |
|---|---|---|---|---|---|---|---|---|---|---|
| Matrix: | | | | | | | | | | |
| copper | 43.6 | 18.6 | 45.0 | 45.0 | 45.0 | 42.9 | 46.2 | 41.7 | 46.2 | 46.2 |
| zinc | | 10.0 | 10.0 | 10.0 | 10.0 | 9.5 | 5.5 | 10.0 | 5.5 | 5.5 |
| tin | 7.4 | | | | | | 3.3 | 3.3 | 3.3 | 3.3 |
| nickel | 6.6 | 7.1 | | | | | | | | |
| titanium | 3.3 | 3.6 | | | | | | | | |
| brass chips | | 28.6 | | | | | | | | |
| iron [1] | | | 5.0 | 8.0 | 10.0 | 7.6 | 8.0 | 8.0 | 7.0 | 8.8 |
| Total | 60.9 | 57.9 | 60.0 | 63.0 | 65.0 | 60.0 | 63.0 | 63.0 | 62.0 | 63.8 |
| Friction Material: | | | | | | | | | | |
| calcined kyanite | 24.2 | 26.1 | 20.0 | 20.0 | 20.0 | 19.0 | 20.0 | 20.0 | 17.5 | 22.0 |
| silica | 4.5 | 4.8 | 7.0 | 4.0 | 2.0 | 3.8 | 4.0 | 4.0 | 3.5 | 4.4 |
| Total | 28.7 | 30.9 | 27.0 | 24.0 | 22.0 | 22.8 | 24.0 | 24.0 | 21.0 | 26.4 |
| Lubricant: | | | | | | | | | | |
| graphite | 1.1 | 1.2 | 8.0 | 8.0 | 8.0 | 7.6 | 8.0 | 8.0 | 7.0 | 8.8 |
| hard coal | | | | | | | | | | |
| lead | | | | | | | | | | |
| Total | 1.1 | 1.2 | 8.0 | 8.0 | 8.0 | 7.6 | 8.0 | 8.0 | 7.0 | 8.8 |
| Antioxidant: | | | | | | | | | | |
| molybdenum | 9.3 | 10.0 | 5.0 | 5.0 | 5.0 | 9.5 | 5.0 | 5.0 | 10.0 | 1.0 |
| Total | 9.3 | 10.0 | 5.0 | 5.0 | 5.0 | 9.5 | 5.0 | 5.0 | 10.0 | 1.0 |

[1] This material in addition to being a non-alloying ingredient of the matrix also serves as a secondary friction producing agent and is therefore classifiable under Friction Material as well as Matrix.

This data is based on the use of calcined kyanite as the principal ceramic material. However, composition 17 has been tested with successful results using mullite bearing materials of both types previously described. The braking compositions of this invention may be described as having a metallic matrix, a prime friction-producing ceramic material and an antioxidant. Stated thus broadly, these are the essential constituents of the novel compositions. The braking compositions are provided in a friction-producing article having an engaging surface which is self-compensating for effects of oxidation induced by high temperatures encountered during the braking cycle. By virtue of the inclusion of an antioxidant, the article is adapted to deliver torque with sufficiently dampened rate of change in effectiveness approaching the end of a high speed stop to prevent objectionable brake chatter.

The ceramic material employed may be silica, uncalcined (raw) kyanite, alumina or other abrasive refractory material. Specific examples of compositions having such materials are the following:

|  | 21 | 22 | 23 |
|---|---|---|---|
| Matrix: |  |  |  |
| copper | 48.8 | 48.8 | 48.8 |
| tin | 3.1 | 3.1 | 3.1 |
| zinc | 5.3 | 5.3 | 5.3 |
| iron | 7.6 | 7.6 | 7.6 |
| Total | 64.8 | 64.8 | 64.8 |
| Friction Material: |  |  |  |
| alumina | 19.1 |  |  |
| kyanite (raw) |  | 19.1 |  |
| silica | 3.8 | 3.8 | 22.9 |
| Total | 22.9 | 22.9 | 22.9 |
| Lubricant: |  |  |  |
| graphite | 7.6 | 7.6 | 7.6 |
| Total | 7.6 | 7.6 | 7.6 |
| Antioxidant: |  |  |  |
| molybdenum | 4.7 | 4.7 | 4.7 |
| Total | 4.7 | 4.7 | 4.7 |

As was expected based on our knowledge of the function of the antioxidant, in tests of the three foregoing compositions (Nos. 21–23), the molybdenum produced an improved brake performance of the metal-ceramic compositions by preventing the torque build-up during a stop which is believed productive of objectionable brake chatter.

The background ceramic plays no essential role in the functioning of the antioxidant. As pointed out previously in the description of the function of the molybdenum, the molybdenum accomplishes its result by controlling the oxide composition of the glaze and it does this by virtue of its affinity for oxygen.

The fact that the molybdenum does operate to advantage irrespective of the ceramic further confirms our belief that the molybdenum accomplishes its results for the reasons stated. The compounder has a wide latitude in the selection of a primary friction producing ceramic and can use whatever refractory abrasive oxide is suggested by the particular requirements. We have found, however, that the mullite has inherently desirable properties which make it a preferred selection in compounding many aircraft brake liners. This superiority of mullite is not attributable to the antioxidant, however; nor does the mullite influence the molybdenum in its assigned function.

Figure 2:
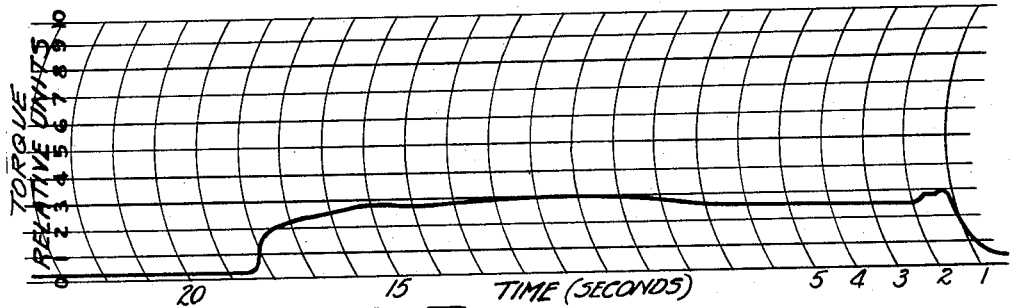
Figures 2 and 3 are recordings illustrating the torque-speed characteristics obtained from dynamometer testings of aircraft brakes utilizing ceramic-metallic linings.
Figure 3:
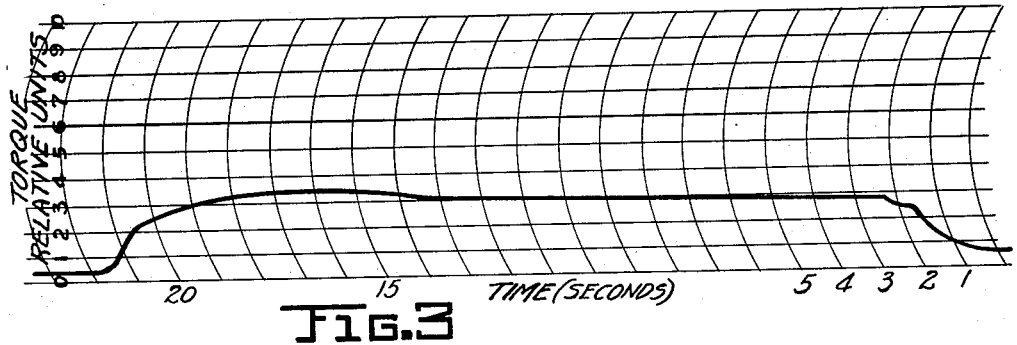
Figure 5:
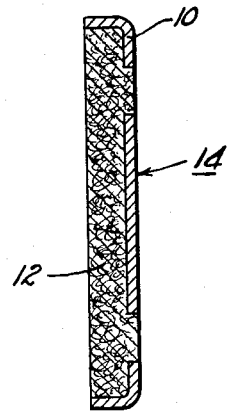
Figure 5 is a cross section of the friction article.

Referring to Figure 3, there is illustrated the torque recording of a typical brake composition of Table I, formulation 13. This recording is a torque v. speed braking history obtained with a standard 84 inch inertia brake dynamometer which simulates actual aircraft braking conditions. Figure 2 is the torque v. speed curve of a conventional ceramic-metallic lining with the same ingredients as formulation 13, but without an antioxidant such as molybdenum and a slight change in the silica content. The composition of the lining used in obtaining the curve in Figure 2 is as follows:

Matrix:
    Copper _____ 45.0
    Zinc _____ 10.0
    Iron [1] _____ 5.0
        Total _____ 60.0

[1] This material in addition to being a non-alloying ingredient of the matrix also serves as a secondary friction producing agent and is therefore classifiable under Friction Material as well as Matrix.

Friction material:
    Calcined Kyanite _____ 20.0
    Silica _____ 12.0
        Total _____ 32.0
Lubricant:
    Graphite _____ 8.0
        Total _____ 8.0
Antioxidant:
    Molybdenum _____ 0.0
        Total _____ 0.0

In interpreting these curves, special emphasis will be placed on the last three second interval of the brake cycle, for it is in this period that torque build-up can produce the objectionable "chatter" of the brake. It has been found by actual experience that brake chattering is not only related to the amount of torque build-up but also the rate of which this build-up occurs. The change in effectiveness of the composition which causes the torque build-up during the braking cycle is relatively unimportant at the higher speeds of the aircraft; it becomes important in relation to "chatter" only during the final seconds of the stop, when speeds of the craft approach ranges of 50 m.p.h. and below.

Torque build-up and resulting "chatter" can be predicted from the torque-velocity curve which records the braking history both as to absolute amount of torque and also the rate of build-up of the torque. At speeds of the aircraft during the last three seconds or so of the braking action, a torque build-up both as to amount and rate of increase is especially critical, since at the lower speeds the effects of torque build-up are more noticeable and are reflected as a pronounced harmonious vibration of the undercarriage. With these principles in view, refer now to the torque curve in Figure 2, noting especially the last three second interval of the braking cycle. It will be seen that there is a sharp increase in torque delivered by the brake at the end of the stop. It is this condition of torque increase which produces brake "chatter" with the objectionable results hereinbefore mentioned.

Turning now to Figure 3, the effect of adding molybdenum to the lining will be demonstrated. Analyzing this torque-speed curve, it is seen that in the interval near the end of the stop, the torque decreases slightly. In other words, the brake lining effectiveness at low velocities does not have an objectionable torque build-up. Such a torque-speed curve demonstrates the braking pattern of a chatter-free brake, one whose characteristics are substantially free of the objectionable results which accompany torque build-up. Further than this the torque build-up has been eliminated though the ceramic content is about 27% of the brake lining. This result has been accomplished by use of molybdenum antioxidant, according to formulation 13 listed in Table I.

Figure 1 illustrates a button testing machine 16 used to preliminarily indicate the braking pattern or friction characteristics of a composition specimen to determine whether it will cause brake "chatter." The operation of this machine is as follows:

Arm 18 is driven through shaft 20 by a variable speed motor 21 and has mounted at opposite ends 24 and 26 brake specimens 14 which are caused to rotate in a circular path about shaft 20. The arm 18 is urged upwardly by a spring 28 compressed between collar 30 and arm 18 thereby yieldably suspending arm 18 and brake specimens 14 affixed thereto. A lever actuator 32 fulcrumed at one end 34 and having a weight 36 selectively displaceable along the length of actuator 32 is urged in a downward direction under the influence of the weight 36 thereby bringing a pivot portion 38 into engagement with the end of shaft 20 to force the rotating arm 18 and brake specimens 14 mounted thereon downwardly against the action of spring 28. The rotating specimens 14 are thus forcibly engaged by a circular plate 40 which is heated by gas jets 41 to simulate braking condition temperatures. The force of engagement of brake specimens 14 with the heated circular plate 40 corresponds to the actuating force of a brake application and may be varied by changing the lever arm of weight 36.

Indicating devices 42 are connected to appropriate parts of the button testing machine 16 to determine such values as braking torque and temperature. During the period of engagement of the brake specimens 14 with plate 40 recordings are made of the braking torque at appropriate periods. The motor 21 is stopped and the "chatter" characteristics of the brake specimens are determined from the torque increase during deceleration of the rotating members from a fixed velocity to zero velocity. Lining specimens which prove satisfactory in this test are then tested on a standard 84 inch inertia brake dynamometer, which simulates the actual braking conditions encountered in field service.

Figure 4:
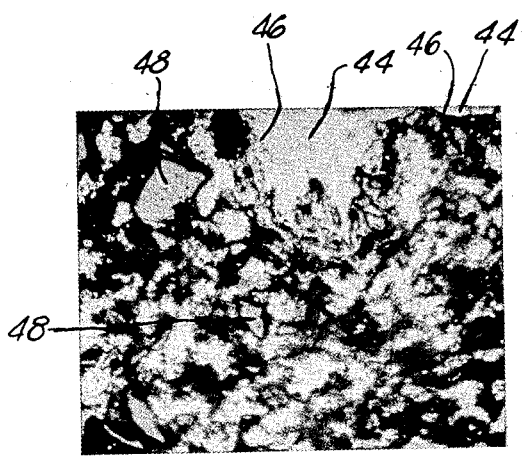
Figure 4 is a photomicrograph of a section of the lining after a series of high speed braking applications.

The surface of the brake lining in the present invention is designed to undergo a selected amount of melting and/or other physical changes at appropriate stages of the braking cycle. This controlled melting and/or other physical changes permit timely additional lubrication which in turn prevents "chatter" of the brake. In view of extensive experimentation, a theory linking physical change of the surface of the lining to the prevention of torque build-up appears to provide a plausible reason for the elimination of "chatter." Physical change of the surface of the lining in the form of melting is substantiated in Figure 4. This is a photomicrograph, 174 magnification, illustrating a cross section of the composition 12 after a series of high-speed braking stops. It will be seen that "glaze" 44 has melted under the influence of heat into voids 46 which are formed in the surface of the lining. Other identifiable materials in the lining are kyanite grains 48.

In formulating compositions including the various ingredients—matrix, lubricant, antioxidant, and prime friction-producing ceramic—it has been necessary to strike some balance between qualities of the brake which are opposed to one another. But, on the whole, the braking compositions set out in Table I will produce linings which provide to an optimum extent effectiveness, long wear, and chatter-free braking.

Although only selected formulations have been described, it will be obvious to those skilled in the art that various changes in the lining ingredients may be made to suit requirements.

We claim:

1. For use in high kinetic energy braking, a friction composition consisting essentially of the following approximate percentages by weight: 55% of matrix material consisting of copper, zinc and tin in the approximate relative proportions of 84:10:6, about 8% of matrix-insoluble iron for produced increased brake effectiveness, about 24% of a primary friction-producing ceramic material consisting principally of calcined kyanite embedded in said matrix in the form of a series of dispersed granule structures and including about 4% of silica for adding to the effectiveness of the brake, about 8% of a carbonaceous lubricating material in the form of graphite, and about 5% of molybdenum interspersed in said composition, said brake composition being compacted and sintered in a ferrous retaining member to provide a friction article adapted for engagement with a relatively rotatable member, said composition being thereby heated from kinetic energy absorbed during braking in such a manner that changes in the friction properties of said composition will tend to prevent chatter of the brake.

2. A friction producing device wherein two surfaces are rubbed together to produce surface temperatures above approximately a red heat, and wherein one of the rubbing surfaces includes a readily oxidizable form of iron: one of said surfaces being formed by a sintered powdered material consisting principally of a powdered metal matrix which remains solid at operating conditions and having a ceramic friction producing material distributed uniformly therethrough, said last mentioned one of said surfaces further including from about 1% to about 12½% by weight of a metal from the group consisting of molybdenum and tungsten for the purpose of inhibiting the formation of the higher oxides of iron upon the surfaces.

3. A friction producing device wherein two surfaces are rubbed together to produce surface temperatures above approximately a red heat, and wherein one of the rubbing surfaces includes a readily oxidizable form of iron: one of said surfaces being formed by a sintered powdered material consisting principally of a powdered metal matrix which remains solid at operating conditions and having from approximately 15% to approximately 43% by weight of a ceramic friction producing material distributed uniformly therethrough, said last mentioned one of said surfaces further including from about 1% to about 12½% by weight of a metal from the group consisting of molybdenum and tungsten for the purpose of inhibiting the formation of the higher oxides of iron upon the surfaces.

4. A friction producing device wherein two surfaces are rubbed together to produce surface temperatures above approximately a red heat, and wherein one of the rubbing surfaces includes a readily oxidizable form of iron: one of said surfaces being formed by a sintered powdered material consisting principally of a powdered metal matrix which remains solid at operating conditions and having a ceramic friction producing material distributed uniformly therethrough, said last mentioned one of said surfaces further including from approximately 1% to approximately 12½% by weight of atoms of molybdenum which oxidize at operating conditions for the purpose of inhibiting the formation of the higher oxides of iron upon the surfaces.

5. A friction producing device wherein two surfaces are rubbed together to produce surface temperatures above approximately a red heat, and wherein one of the rubbing surfaces includes a readily oxidizable form of iron: One of said surfaces being formed by a sintered powdered material consisting essentially of from approximately 35% to approximately 65% by weight of a powdered metal matrix which is solid at operating conditions, from approximately 15% to approximately 43% by weight of a ceramic friction producing material distributed uniformly therethrough, and from about 1% to about 12½% by weight of a metal from the group consisting of molybdenum and tungsten for the purpose of inhibiting the formation of the higher oxides of iron upon the surfaces.

6. A friction producing device wherein two surfaces are rubbed together to produce surface temperatures above approximately a red heat, and wherein one of the rubbing surfaces includes a readily oxidizable form of iron: one of said surfaces being formed by a sintered powdered material consisting essentially of from approximately 35% to approximately 65% by weight of a powdered metal matrix which is solid at operating conditions, from approximately 15% to approximately 43% by weight of a ceramic friction producing material distributed uniformly therethrough, and approximately 5% by weight of molybdenum for the purposes of inhibiting the formation of the higher oxides of iron upon the surfaces.

7. A friction producing device wherein two surfaces are rubbed together to produce surface temperatures above approximately a red heat, and wherein one of the rubbing surfaces includes a readily oxidizable form of iron: one of said surfaces being formed by a sintered powdered material consisting essentially of a powdered metal matrix having at least one ceramic friction producing material from the group consisting of calcined kyanite, raw kyanite, alumina and silica, a carbonaceous lubricant, and from approximately 1% to approximately 12½% by weight of a material from the group consisting of atoms of molybdenum and tungsten which oxidize at operating conditions, and whereby chatter and torque build-up are inhibited.

8. A friction producing device wherein two surfaces are rubbed together to produce surface temperatures above approximately a red heat, and wherein one of the rubbing surfaces includes a readily oxidizable form of iron: one of said surfaces being formed by a uniformly mixed and sintered powdered material consisting essentially of a powdered metal matrix having at least one ceramic friction producing material from the group consisting of calcined kyanite, raw kyanite, alumina, and silica, a carbonaceous lubricant, and from approximately 1% to approximately 12½% by weight of powdered molybdenum having a particle size of approximately 200 mesh, and whereby chatter and torque build-up are inhibited.

9. A method of friction control for high energy absorbing aircraft brakes and the like of the type having two structures forming surfaces that are rubbed together in an oxidizing atmosphere, one of said structures being formed of a sintered powdered material consisting principally of a powdered metal matrix having a ceramic friction producing material distributed uniformly therethrough, and at least one of said structures also including a readily oxidizable form of iron, said method comprising: providing one of said structures with from approximately 1% to approximately 12½% by weight of a material of the class consisting of atoms of molybdenum and tungsten which oxidize at the rubbing temperature, and forcing said structures together with sufficient rubbing force to generate local surface friction temperatures in excess of approximately 2500° F. to form a molten oxide glaze in which the formation of the higher oxides of iron are substantially prevented by the preferential oxidation of the molybdenum and/or tungsten atoms.

10. A method of friction control for high energy absorbing aircraft brakes and the like of the type having two structures forming surfaces that are rubbed together in an oxidizing atmosphere, one of said structures being formed of a sintered powdered material consisting principally of a powdered metal matrix having a ceramic friction producing material distributed uniformly therethrough, and at least one of said structures also including a readily oxidizable form of iron, said method comprising: providing one of said structures with from approximately.1% to approximately 12½% by weight of atoms of molybdenum which oxidize at the rubbing temperatures, and forcing said structures together with sufficient rubbing force to generate local surface friction temperatures in excess of approximately 2500° F. to form a molten oxide glaze in which the formation of the higher oxides of iron are substantially prevented by the preferential oxidation of the molybdenum atoms.

11. A method of friction control for high energy absorbing aircraft brakes and the like of the type having two structures forming surfaces that are rubbed together in an oxidizing atmosphere, one of said structures being formed of a sintered powdered material consisting principally of a powdered metal matrix having a ceramic friction producing material distributed uniformly therethrough, and at least one of said structures also including a readily oxidizable form of iron, said method comprising: providing one of said structures with from approximately 1% to approximately 12½% by weight of molybdenum and forcing said structures together with sufficient rubbing force to form a molten iron oxide glaze in which the formation of the higher oxides of iron are substantially prevented by the preferential oxidation of the molybdenum atoms.

References Cited in the file of this patent

UNITED STATES PATENTS

| | | |
|---|---|---|
| 2,072,070 | Fisher | Feb. 23, 1937 |
| 2,307,512 | Kelly | Jan. 5, 1943 |
| 2,389,061 | Kuzmick | Nov. 13, 1945 |
| 2,408,430 | Lowey et al. | Oct. 1, 1946 |
| 2,470,269 | Schaefer | May 17, 1949 |

OTHER REFERENCES

Norton: "Refractories," 1931, 1st edition, published by McGraw-Hill Book Co., New York, page 191.

UNITED STATES PATENT OFFICE
CERTIFICATION OF CORRECTION

Patent No. 2,948,955                            August 16, 1960

Alfred W. Allen et al.

It is hereby certified that error appears in the above numbered patent requiring correction and that the said Letters Patent should read as corrected below.

Column 4, line 35, for "producting" read -- producing --; line 65, for "SiO" read -- $SiO_2$ --.

Signed and sealed this 4th day of July 1961.

(SEAL)
Attest:

ERNEST W. SWIDER
Attesting Officer

DAVID L. LADD
Commissioner of Patents